(12) United States Patent
Elliott

(10) Patent No.: US 8,303,777 B2
(45) Date of Patent: Nov. 6, 2012

(54) MANUFACTURE OF CHARCOAL

(76) Inventor: Andrew Mark Elliott, Sheffield (GB)

( * ) Notice: Subject to any disclaimer, the term of this patent is extended or adjusted under 35 U.S.C. 154(b) by 0 days.

(21) Appl. No.: 13/474,859

(22) Filed: May 18, 2012

(65) Prior Publication Data

US 2012/0222949 A1 Sep. 6, 2012

Related U.S. Application Data

(62) Division of application No. 12/478,916, filed on Jun. 5, 2009, now Pat. No. 8,202,400.

(51) Int. Cl.
*C10B 49/02* (2006.01)
(52) U.S. Cl. ............ 202/85; 202/91; 202/221
(58) Field of Classification Search .......... 202/85, 202/86, 87, 91, 93, 95, 99, 108, 120, 121, 202/208, 215, 221; 48/76, 111; 110/214, 110/229
See application file for complete search history.

(56) References Cited

U.S. PATENT DOCUMENTS

| | | | |
|---|---|---|---|
| 1,414,401 A * | 5/1922 | Farup | ............ 201/19 |
| 1,813,156 A | 7/1931 | Gilchrist | |
| 4,038,154 A | 7/1977 | Barnebey | |
| 4,126,518 A | 11/1978 | da Silva Bento | |
| 4,233,024 A | 11/1980 | Plass | |
| 5,279,234 A | 1/1994 | Bender et al. | |
| 2006/0278141 A1 | 12/2006 | Edmondson | |

FOREIGN PATENT DOCUMENTS

| | | |
|---|---|---|
| EP | 1508607 A1 | 2/2005 |
| GB | 191104935 | 0/1912 |
| JP | 2004189788 A | 7/2004 |

* cited by examiner

*Primary Examiner* — Jill Warden
*Assistant Examiner* — Joye L Woodard
(74) *Attorney, Agent, or Firm* — Richard M. Goldberg

(57) ABSTRACT

Apparatus for the manufacture of charcoal, comprising a unit having walls defining a primary combustion chamber, and a material inlet for allowing a feed of wood chips though said material inlet into said apparatus. A trough is located at a lower height than said material inlet such that material passing through said material inlet is able to fall into the trough. An air inlet is located below the material inlet such that, when wood chips are located within the trough piled up to said material inlet, air passing from said air inlet passes through said wood-chips and into the primary combustion chamber.

18 Claims, 5 Drawing Sheets

MANUFACTURE OF CHARCOAL

CROSS REFERENCE TO RELATED APPLICATIONS

This application represents the first application for a patent directed towards the invention and the subject matter.

BACKGROUND OF THE INVENTION

1. Field of the Invention

The present invention relates to a method and apparatus for continuous manufacture of charcoal.

2. Description of the Related Art

Methods for manufacturing charcoal are known in which pieces of wood are heated within a container that is deficient of air. A problem with such methods is that the material is processed in batches, involving loading each batch of material into a container that is processed before being unloaded for re-use. In addition, processing time is prohibitively long, being typically one or more days.

BRIEF SUMMARY OF THE INVENTION

According to a first aspect of the present invention, there is provided apparatus for continuous manufacture of charcoal, comprising a unit having: walls defining a primary combustion chamber; a material inlet for allowing a feed of wood chips though said material inlet into said apparatus; a trough located at a lower height than said material inlet such that material passing through said material inlet is able to fall into the trough; and an air inlet located below the material inlet such that, when wood chips are located within the trough piled up to said material inlet, air passing from said air inlet passes through said wood-chips and into the primary combustion chamber.

According to a second aspect of the present invention, there is provided a method of manufacturing charcoal comprising: obtaining a supply of material comprising particles of wood; feeding said material through a material inlet to maintain a height of a pile comprising particulate material; in a chamber adjacent to said pile, combusting flammable components given off by said particulate material to generate heat, such that said heat causes further flammable components to be given off by said particulate material; providing a flow of air through a layer of said pile, such that within said layer flammable components given off by said particulate material are combusted within said pile; and removing charcoal material from said pile such that particulate material within said pile moves past said flow of air.

DETAILED DESCRIPTION OF THE PREFERRED EMBODIMENTS

FIG. 1

Figure 1:
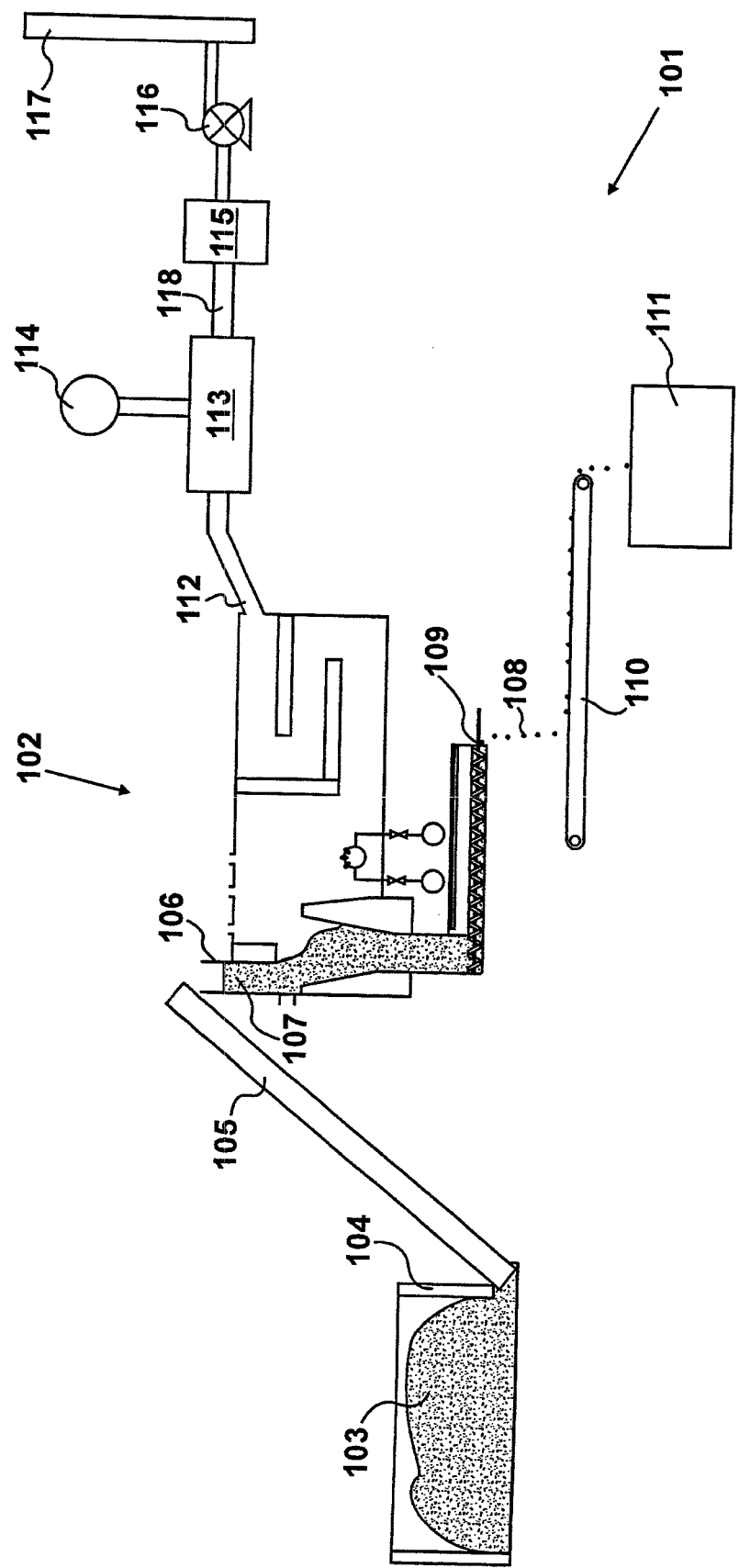
FIG. 1 shows a system 101 including apparatus 102 for manufacturing charcoal.

A system 101 including apparatus 102 for manufacturing charcoal is shown in FIG. 1.

The charcoal manufactured by the apparatus 102 is made from wood chips 103 that are initially stored in a container 104. The wood chips 103 may be produced on the same site as the system 101 are alternatively transported in from a separate production site. For reasons explained below, the wood chips are manufactured such that they comprise particles of wood having a largest dimension between fifty millimeters (50 mm) and one hundred and fifty millimeters (150 mm).

The wood chips are typically formed from waste wood, either used wood, such as old furniture, doors, etc. or freshly cut wood. The wood chips are formed using conventional equipment, for example comprising rotating blades, or flailing hammers, which progressively reduces the material particle size until it is small enough to fall through a screen. Thus, the dimensions of the apertures in the screen determine the sizes of wood chips produced. In the present embodiment the screen has square apertures having a width of approximately 75 mm (seventy-five millimeters).

The system 101 comprises a conveyor 105 for conveying wood chips from the container 104 into a hopper 106 positioned at a material inlet 107 of the apparatus 102.

The apparatus 102 processes the wood chips 103 to produce charcoal 108 that is expelled from the apparatus 102 at its material outlet 109. The charcoal emerging from the outlet has a temperature of typically 200° C., and is deposited onto a conveyor 110 where it air-cools down to typically 40° C. before being deposited into a container 111 for temporary storage or transportation.

The charcoal 108 may then be further processed depending upon its intended use. For example, it may be ground to a powder and formed into briquettes in accordance with known methods.

Operation of the apparatus 102 generates excess heat, which is carried from the apparatus in the form of hot waste gases through its gas outlet 112. The waste gases are passed through a waste heat boiler in which heat from the hot gases is used to generate steam. The steam is then used to drive a turbine 114 and thereby generate electricity.

After passing through the waste heat boiler the waste gases are drawn through a bag filter 115 by an exhaust fan 116 before being expelled to atmosphere through a stack 117.

The exhaust fan creates negative pressures (i.e. air pressures below ambient atmospheric pressure), not only in the exhaust pipework 118, connecting the apparatus 102, boiler 113 bag filter 115 and fan 116, but also within combustion chambers located within the apparatus 102. A pressure sensor (not shown) in the gas outlet 112 of the apparatus 102 provides a measure of pressure within the outlet, and the speed of the fan 116 is adjusted in response to the pressure measurement.

FIG. 2

Figure 2:
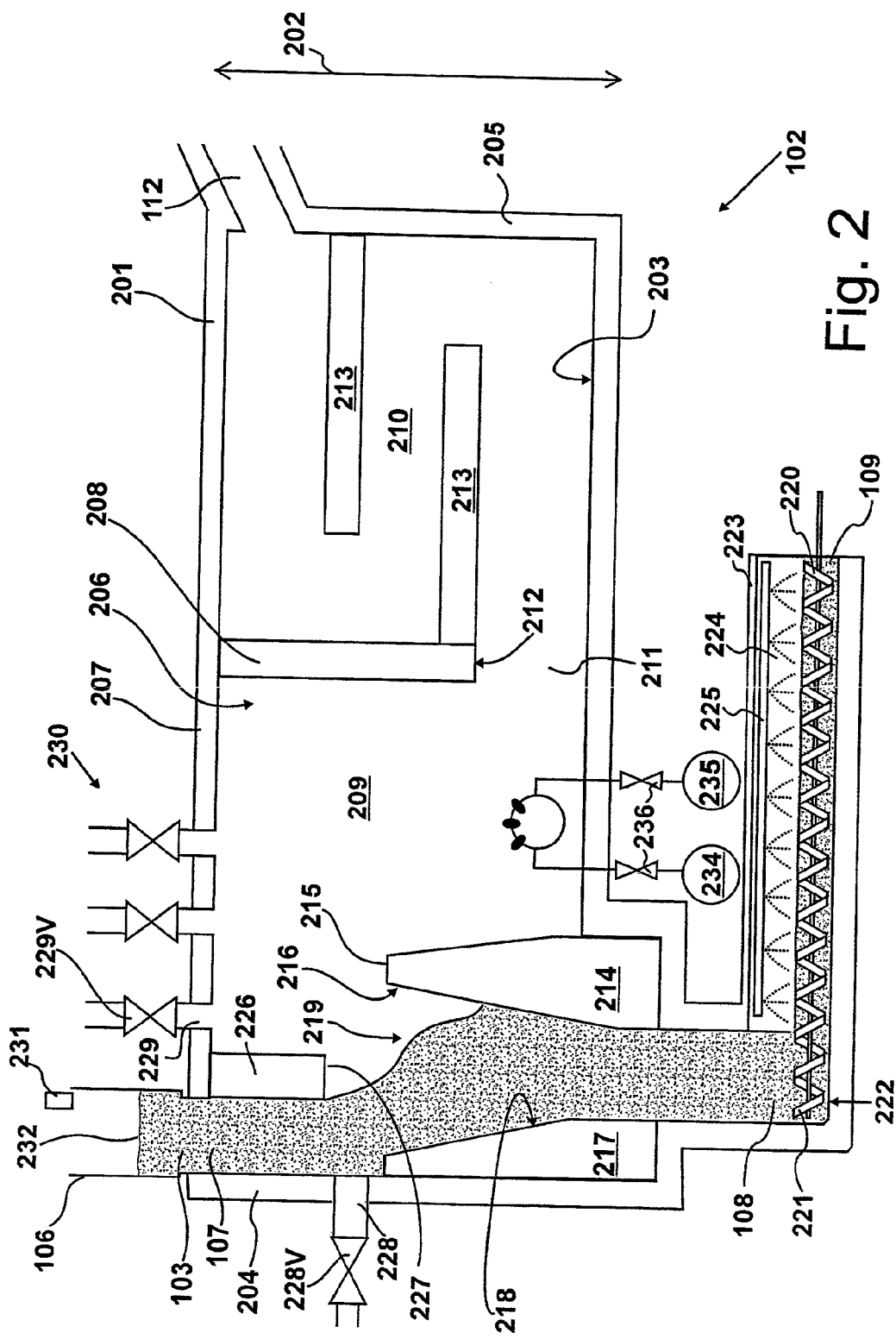
FIG. 2 shows a simplified cross-sectional view of the apparatus 102.

A simplified cross-sectional view of the apparatus 102 is shown in FIG. 2. In the present embodiment, the apparatus 102 comprises a unit having the general form of a rectangular box 201 with a length of approximately five meters (5 m), a height (shown by arrow 202) of approximately two meters (2 m), and a width (into the page) of approximately one point seven meters (1.7 m).

The box 201 comprises a floor 203, front wall 204, a rear wall 205, two side walls 206 and a horizontal upper wall 207. The box 201 is formed of steel sheet material and lined with refractory blocks (in the present embodiment comprising calcium silicate) capable of withstanding the temperatures of up to 1200° C. that are reached during operation of the apparatus 102.

The apparatus comprises an interior baffle wall 208 which extends downwards from the ceiling created by the upper wall 207 and from one side wall 206 to the other side wall. The baffle wall 208 divides a primary combustion chamber 209 from a secondary combustion chamber 210. However a rectangular shaped gap 211 is formed between the bottom edge 212 of the baffle wall 208 and the floor 203 such that gases in primary combustion chamber 209 are able to escape into the secondary combustion chamber 210.

In the present embodiment, the secondary combustion chamber also has two horizontal baffle walls 213 which divide up the secondary combustion chamber to provide an elongated meandering path, which waste gases must traverse between the gap 211 and the gas outlet 112. During operation, this meandering path ensures that the gases passing through secondary combustion chamber 210 have sufficient time to fully combust before leaving the apparatus through outlet 112.

A trough wall 214 extends upwards from the floor 203 to a height of approximately one hundred and ten centimeters (1.1 m) and from one side wall 206 to the other side wall. The trough wall 214 extends parallel to, and between, the front wall 204 and the baffle wall 208. The trough wall is tapered such that its top edge 215 is narrower than its base portion, and such that its face 216 that faces the front wall 204 slopes downwards towards it.

The front wall 204 is provided with a lower portion 217 of similar height to the trough wall 214, and which has a sloping face 218 that slopes downwards towards the trough wall. A trough 219 is therefore defined by the lower portion 217 of the front wall and the trough wall 214, and due to the sloping faces 216 and 218 of the trough wall 214 and front wall 204 the trough is relatively wider at its top than its bottom. In the present embodiment the top of the trough has a width of approximately one meter (1 m) while a bottom portion of the trough has a width of a half of one meter (0.5 m).

A conveyor mechanism 220 has a first end 221 located within the bottom portion of the trough 219 just above its bottom surface 222. The conveyor mechanism extends through a horizontally extending enclosure 223 from the trough 219 at one end of the enclosure to the material outlet 109 at the opposite end of the enclosure. In the present embodiment the conveyor mechanism comprises a screw-type conveyor configured to continuously transport particles of charcoal 108 from the bottom of the trough to the material outlet 109.

The enclosure 223 has an extended space 224 above the conveyor 220 which contains a water jet arrangement 225 for spraying jets of water onto the charcoal during transportation by the conveyor mechanism 220. During operation, charcoal received by the conveyor 220 at the bottom of the trough 219 is typically at a temperature of approximately 600° C. Consequently, the charcoal is quenched by the water jets produced by the arrangement 225 to ensure that the charcoal does not burn when exposed to air after leaving the outlet 109. The rate of water provided by the water jet arrangement 225 is calculated and arranged to be sufficient to reduce the temperature of the charcoal leaving the outlet 109 to approximately 200° C. It may be noted that the temperature of the charcoal leaving the material outlet 109 is kept above 100° C. to prevent water remaining in liquid form on the charcoal.

An inlet wall 226 extends downwards from the upper wall 207, parallel to the front wall 204 and from one side wall 206 to the other side wall. A gap is provided in the upper wall 207 between the inlet wall 226 and the front wall 204. Consequently, the inlet wall 226, the front wall 204 and the two side walls 206 form a downwardly extending passageway which provides the material inlet 107.

The inlet wall 226 has a bottom edge 227 located above the top end of the trough 219 and the hopper 106 is fixed to the upper end of the material inlet 107. Consequently, when the apparatus is empty of wood/charcoal material, it is possible for wood chip particles dropped into the hopper 106 to passes through the material inlet 107 and drop into the trough 219.

The apparatus 102 also comprises an air inlet 228 provided in the front wall 204, which supplies air to the apparatus via a valve 228V. The air inlet 228 has an elongated rectangular opening such that it extends horizontally across the inner face of the front wall 204 substantially from one side wall 206 to the other side wall.

A secondary air inlet 229 is provided in the upper wall 207 to allow air to be drawn into, or blown into the primary combustion chamber 209, via a valve 229V. In the present embodiment the secondary air inlet is one of an array of air inlets 230 located in the ceiling of the primary combustion chamber 209.

During operation, of the apparatus it is necessary to maintain a stock of material in the hopper 106. For this reason, a position sensor 231 is provided for detecting the level of the upper surface 232 of wood chip material 103 in the hopper 106. When signals from the position sensor indicate that the level has dropped below a threshold level, the conveyor mechanism 105 is energised to drop wood chip material into the hopper. When an upper threshold level is reached the conveyor 105 is stopped. In the present embodiment, the position sensor is a position sensor of known type that detects the material surface by radar. However, other embodiments employ other remote sensing position sensors, such as those using ultrasonic signals for detecting a material surface. Still further other embodiments use a pair of sensors that detect the presence or absence of material at an upper and at a lower level. In these latter embodiments, detection of material at the upper sensor causes the conveyor 105 to stop, while the absence of material detected at the lower sensing causes the conveyor to restart.

During normal operation of the apparatus 102, the process converting wood chip to particles of charcoal generates an excess of heat. However, at times it is necessary to provide additional heat to the primary combustion chamber 209. Consequently, an auxiliary burner 233 is provided on the floor 203 in the primary combustion chamber 209. The burner 233 is supplied with fuel and air from corresponding supplies 234 and 235 via control valves 236. A temperature sensor (not shown) is located in the primary combustion chamber 209, and, during operation of the apparatus, when the detected temperature is less than a required lower threshold value the valves 236 are operated to ignite the burner 233.

In the present embodiment, the burner is an oil burner, but other fluid fuel burners, such as gas burners are used in other embodiments.

Figure 3:
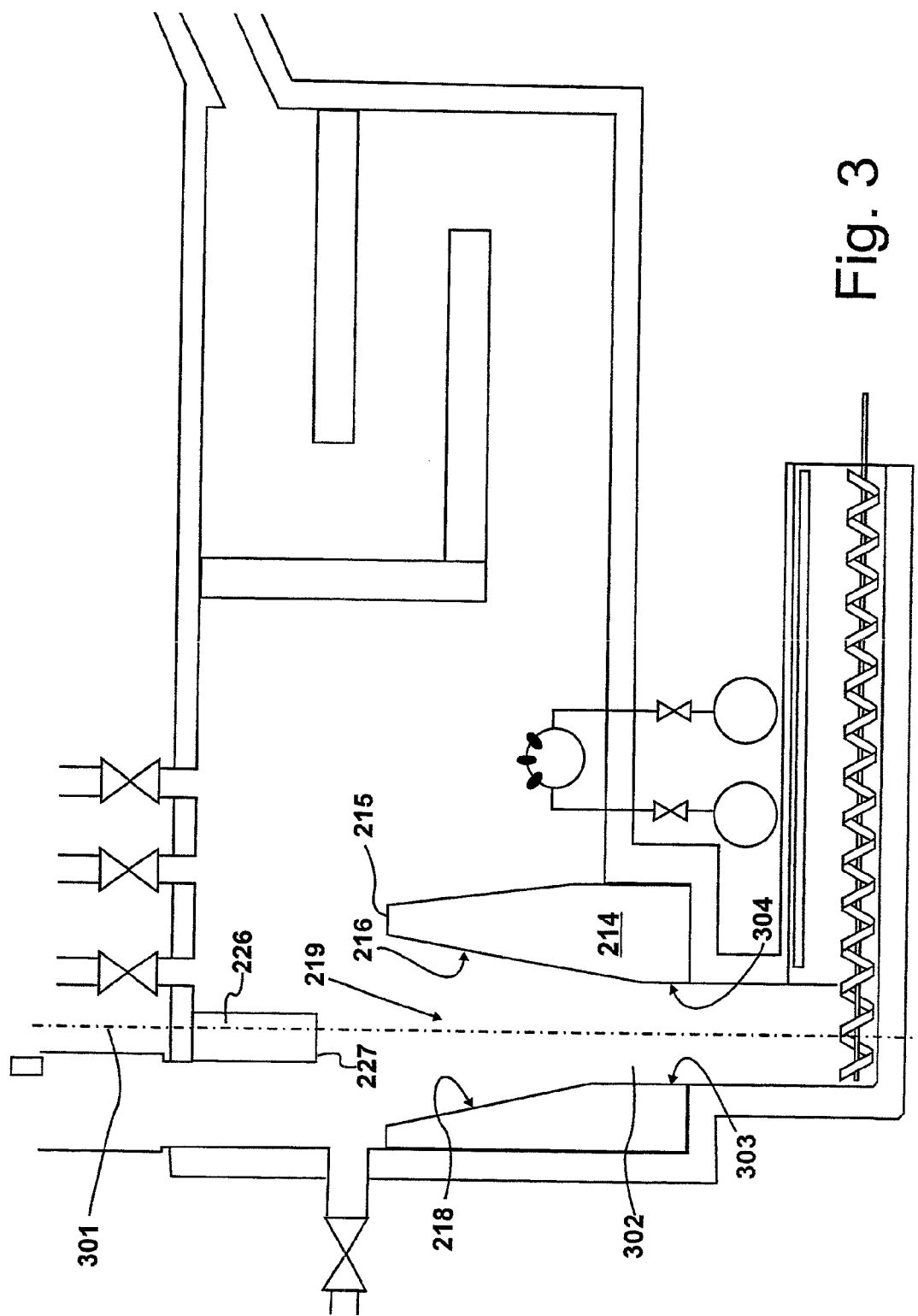
FIG. 3 shows again the cross-sectional view of the apparatus 102 shown in FIG. 2, illustrating a plane 301.
Figure 4:
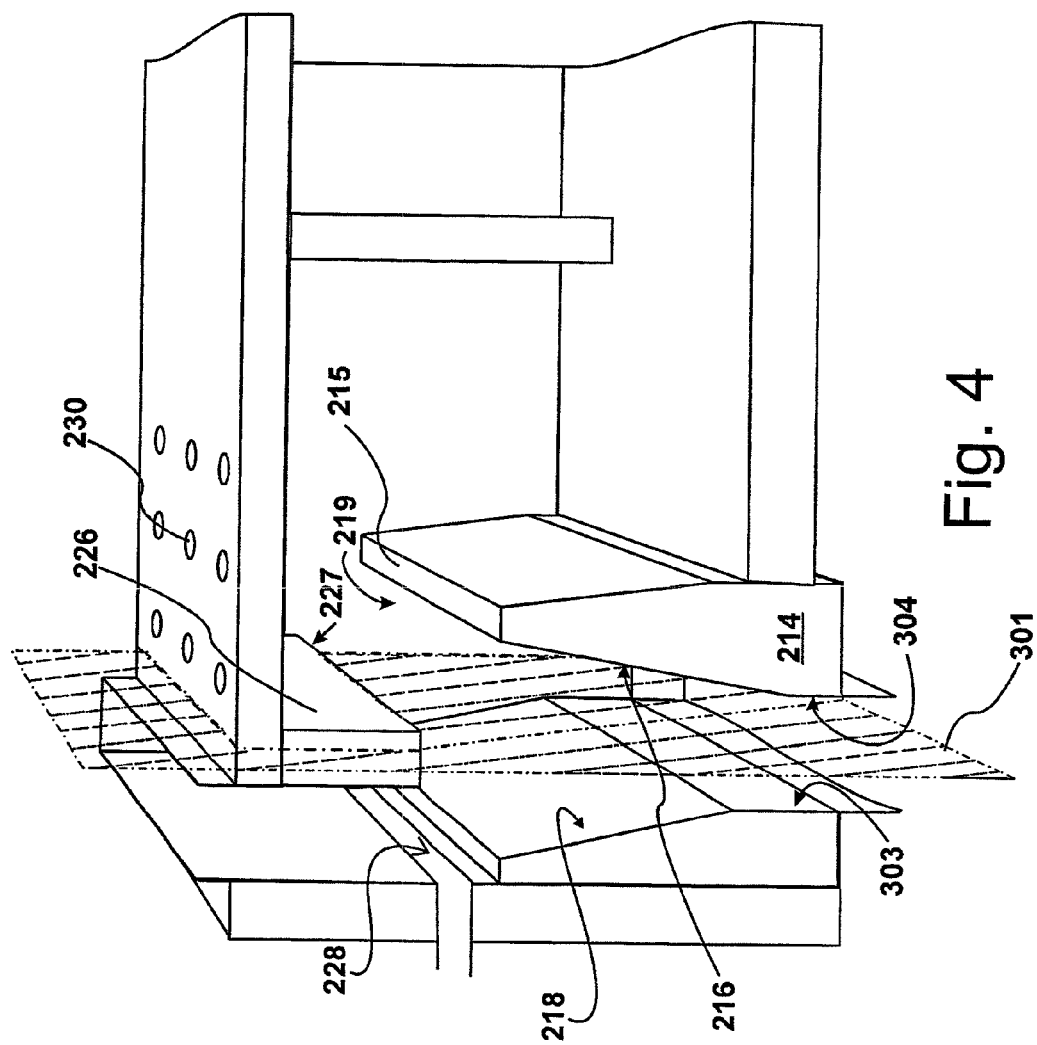
FIG. 4 shows a cross-sectional perspective view of a front portion of the apparatus 102, also showing the plane 301.

FIGS. 3 and 4

The cross-sectional view of the apparatus 102 shown in FIG. 2 is shown again in FIG. 3, illustrating a plane 301, and a cross-sectional perspective view of a front portion of the apparatus 102 is shown in FIG. 3, also showing the plane 301.

As previously mentioned, the trough 219 has inwardly sloping sides 216 and 218 such that a lower portion of the trough 302 is narrower than the top end of the trough. The lower portion 302 of the trough has substantially parallel surfaces 303 and 304 that extend vertically downwards.

The plane 301 is a vertical plane extending parallel to each of the two surfaces 303 and 304, and equidistant from said surfaces. Now, as illustrated in FIGS. 3 and 4, the material inlet 107 is located to one side of the plane 301, while the primary combustion chamber is located on the other side of the plane. As described below, when wood chips are supplied to the apparatus 102, this arrangement leads to a pile of material of a desired shape.

It should also be noted that the lower edge 227 of the inlet wall 226 is higher than the top edge 215 of the trough wall 214. Furthermore, the air inlet 228 is positioned at a height between that of the top edge 215 of the trough wall 214 and the lower edge 227 of the inlet wall 226. Consequently, air flowing into the apparatus 102 through the air inlet 228 generally passes below the lower edge 227 and above the top edge 215.

As illustrated in FIG. 4, the array of air inlets 230 comprises three rows of three air inlets.

FIG. 5

Figure 5:
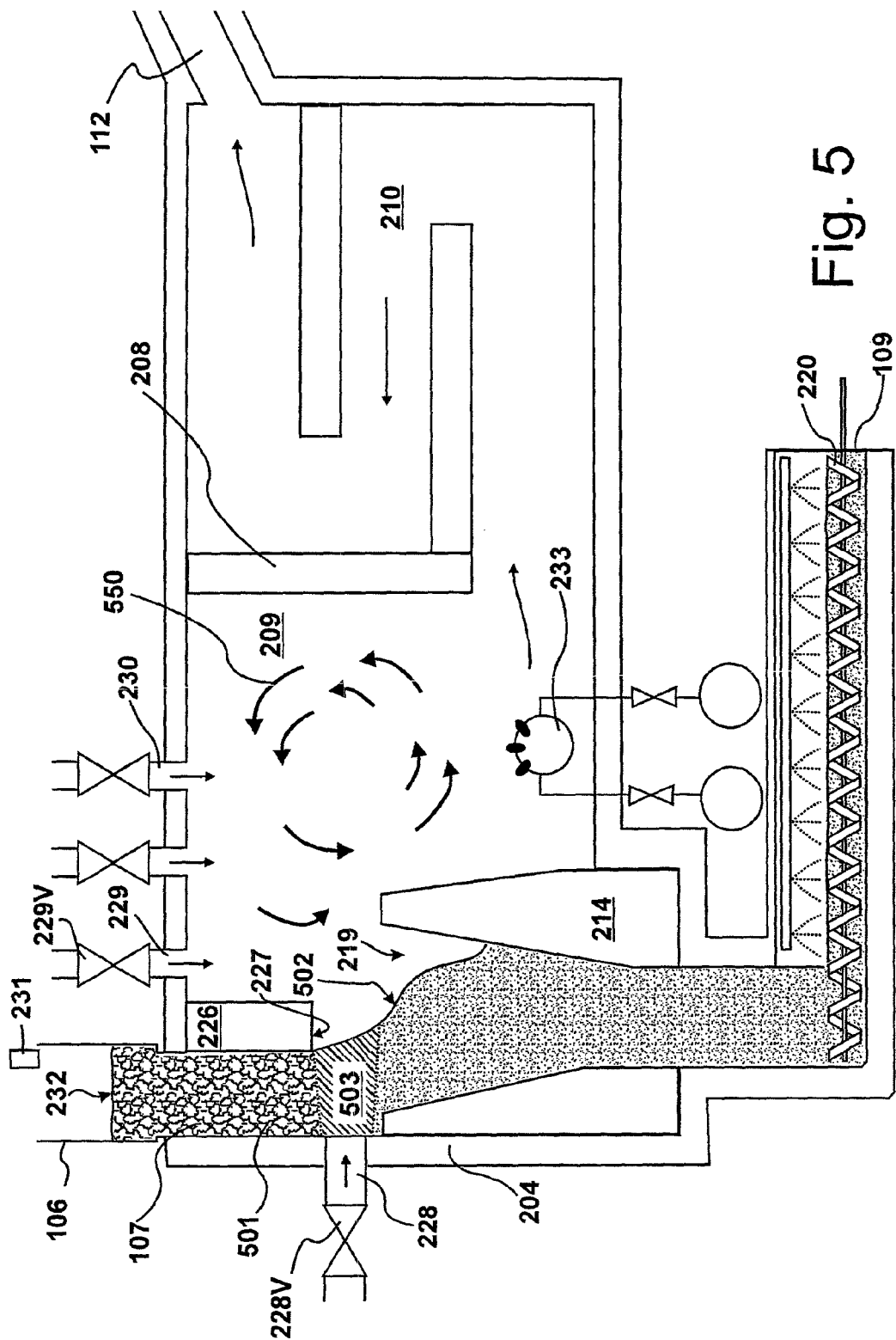
FIG. 5 shows the apparatus 102 illustrating the operation of the apparatus.

The cross-sectional view of the apparatus 102 shown in FIG. 2 is shown again in FIG. 5, illustrating the operation of the apparatus.

Before production of charcoal commences, it is necessary to bring the interior of the combustion chamber 209 up to operating temperature. Consequently, before any wood chip material is supplied to the apparatus 102, the material inlet 107 and outlet 109 are closed, and the burner 233 is ignited. The valves such as valve 228V and 229V providing air to the inlets 228, 229, 230 are also partially closed, but provide air for the burner at a restricted flow rate.

When the temperature within the primary combustion chamber reaches a minimum operating temperature, (of 850° C. in the present embodiment), the material inlet 107 is opened and wood chip material is supplied to the inlet. As a result, wood chip material piles up in the trough 219 to create a pile 501 that extends back up through the material inlet 107. The upper surface level 232 of material is subsequently maintained within the hopper 106 by operation of the conveyor 105 in accordance with signals received from the position sensor 231 (as described previously). Meanwhile the conveyor 220 is continuously operated to remove material from the pile 501 at the bottom of the trough 219.

As illustrated in FIG. 5, the positioning of the material inlet 107 to one side of the trough 219 causes the wood chip particles to pile up in the trough adjacent to the front wall 204. Consequently, the wood chip particles form a pile 501, such that from the lower edge 227 of the inlet wall 226 down to the trough wall 214, the pile has a sloping surface 502 generally facing toward the primary combustion chamber 209. The surface 502 of the pile 501 is therefore subjected to direct radiant heat from the primary combustion chamber 209.

It should also be noted that the pile 501 has a relatively steeply sloping surface 502. Such a steep slope is possible due to the general resistance to flow due to intermeshing of the relatively large wood chips.

Heat from the primary combustion chamber 209 causes the wood chip material to give off various volatile components, some of which are flammable. Consequently, such flammable components mix with air provided through air inlets 230 and combust within the primary combustion chamber 209. This combustion causes the temperature within the combustion chamber 209 to rise further and so increase the heat applied to the wood chip material.

It may be noted that, when normal stable operating conditions are established, the quantity of flammable components given off from the pile 501 and combusted in the primary combustion chamber 209 is sufficient to maintain a temperature of between 1100° C. and 1200° C. in the chamber 209, without operation of the burner 233. In such conditions, the combustion within the chamber 209, along with the air flows provided by the air inlets 229, 230, and the presence of the baffle wall 208, cause the burning gases to rotate around the primary combustion chamber 209 as indicated by arrows 550. Thus, the majority of the combustion takes place in the primary combustion chamber, close to the pile 501 of material. Any gases not combusted in the primary combustion chamber are combusted in the secondary combustion chamber before the gases leave through the outlet 112.

With the wood chip material supplied to the apparatus 102, the valve 228V is opened such that air is also supplied via the air inlet 228. In the present embodiment, air is drawn in through the inlet 228 by the negative pressure present in the primary combustion chamber 209, caused by the operation of the exhaust fan 116 (shown in FIG. 1). However, when a higher rate of flow of air is required, an inlet fan also may be used to force in air through the inlet 228.

Due to the relatively large dimensions of the wood chip particles, the pile 501 contains sufficiently large gaps between the wood chip particles to allow the air provided at the inlet 228 to flow through the pile. Consequently, a substantially horizontal layer 503 of the pile 501 adjacent to the air inlet 228 contains wood chip particles that are surrounded by air. Particles in this layer 503 are also subjected to direct radiation from the combustion chamber 209 and so they give off volatile components including flammable components. Consequently, the flammable components combust in the air flowing from the air inlet 228, in close proximity to the wood chip particles and within the layer 503 itself. Thus the layer 503 of the pile 501 is effectively a layer of burning wood chips.

It should be understood that the pile 501 is not static, but comprises a pile of particles that travel from the inlet 107 to the bottom of the trough 219 due to the action of the conveyor 220, and gravity. Thus, wood chip particles pass through the layer 503, within a period of typically 5 to 10 minutes, as they travel downwards.

While in the layer 503, the wood chip particles reach temperatures of approximately 600° C., within a few minutes, and begin to carbonise. This initial carbonising stage is essential to the process, as it ensures that all of the particles, across the full width of the pile, are brought to a sufficiently high temperature to start the carbonisation process.

As the particles travel further downwards, into the trough, the partially carbonised particles continue to be heated by the heat generated in the combustion chamber 209. Consequently, they remain at a temperature of approximately 600° C. for up to an hour, and they continue to give off gases and to carbonise. However, as there is no oxygen supplied to the trough itself, the gases that are given off generally emerge from the surface 502 of the pile 501 and become mixed with the burning gases in the primary combustion chamber 209. Furthermore, due to the lack of oxygen below the layer 503, the particles below the layer 503 carbonise but cannot oxidise. (If any oxygen is present in this part of the pile, it preferentially causes combustion of the emitted gases rather than the particles themselves.) As a result, the particles reaching the bottom of the trough 219 comprise charcoal.

When the process is first started, wood chip material supplied to the apparatus 102 passes through without being completely carbonised. (Such material may be reprocessed by the apparatus and fully carbonised.) However, when the apparatus 102 reaches its normal steady-state operating mode, wood chip particles passing through the material inlet 107 emerge as charcoal from the outlet 109 within a matter of a few hours.

It should be understood that the rate at which material passes through the apparatus is determined by the rate at which the conveyor 220 expels material from the outlet 109. Thus, this rate is set at a value that ensures that the wood particles supplied at the material inlet 107 are fully carbonised during the transit through the apparatus.

As mentioned previously, the material inlet 107 is a downwardly extending passageway, that is formed between the front wall 204 and the internal inlet wall 226. During operation, wood chip material travels through the passageway in approximately 10 to 15 minutes. As the passageway is only separated from the primary combustion chamber 209 by the inlet wall 226, heat from the chamber 209 passes through the inlet wall 226 and raises the temperature of wood chip material in the passageway to between 100° C. and 200° C. Consequently, material emerging at the bottom of the passageway is pre-heated, and at least partially dried.

It should also be noted that the wood chip material in the passageway partially plugs the material inlet 107, and prevents air from being drawn in through the material inlet 107 without it passing through the wood chip material in the layer 503.

The intermeshing of the wood chips can potentially cause problems in the material inlet, as the wood chips form bridges, stopping the material above from falling under gravity. However, the present embodiment includes reciprocating pokers (not shown) which extend into the inlet passageway and mechanically disturb the wood chips within their vicinity to prevent such bridges forming.

In the present embodiment, clean fresh air is supplied to the air inlet 228. However, in alternative embodiments, at least a portion of the air that is provided to the air inlet 228 comprises hot air previously expelled through the gas outlet 112. Air within the outlet 112 comprises approximately 6% to 7% of oxygen and therefore it is still usable for combustion purposes. Advantageously, as the air from the outlet 112 is hot, when it is supplied through the inlet 228 it assists with heating the wood chips in layer 503.

In a further alternative embodiment, hot air from the outlet 112 is passed through a heat exchanger used to heat fresh air supplied to the air inlet 228.

The invention claimed is:

1. Apparatus for continuous manufacture of charcoal, comprising a unit having:
    chamber walls defining a chamber having a trough and a primary combustion space, in which an upper one of said walls defines a ceiling for said primary combustion space;
    a material inlet for allowing a feed of wood chips through said material inlet into said trough, said trough being located at a lower height than said material inlet such that material passing through said material inlet is able to fall into the trough;
    a first air inlet located in a first one of said chamber walls and below the material inlet such that, when wood chips are located within the trough piled up to said material inlet, air passing from said air inlet passes through said wood-chips and into the primary combustion space; and
    a second air inlet providing a flow of air downwards from said ceiling into said primary combustion space;
    wherein said material inlet comprises a downwardly extending passageway defined by a material inlet wall extending downwards from said ceiling, said material inlet wall separating said passageway from said primary combustion space, such that heat generated within said primary combustion space passes through said material inlet wall into said passageway.

2. The apparatus of claim 1, wherein said trough extends along a vertical plane, said material inlet extends along said trough to one side of said vertical plane and said primary combustion space extends along said trough to the other side of said vertical plane, such that when particulate material is located within said trough piled up to said material inlet said particulate material defines a surface exposed to said primary combustion space.

3. The apparatus of claim 1, further comprising a fluid fuel burner located within said primary combustion space for increasing the temperature of gases within said primary combustion space.

4. The apparatus of claim 1, wherein said unit comprises a secondary combustion chamber having a gas outlet, said secondary combustion chamber being in communication with said primary combustion space such that gases are allowed to pass from said primary combustion chamber space through said secondary combustion chamber to said outlet.

5. The apparatus of claim 1, further comprising a conveyor mechanism arranged to transport particulate matter from a bottom end of said trough.

6. The apparatus of claim 1, wherein:
    said trough is defined by a pair of walls extending along said trough, said pair of walls comprising a rear wall and a front wall, said rear wall being positioned adjacent to said primary combustion space between said primary combustion space and said front wall; and
    said material inlet is located closer to said front wall than the rear wall.

7. The apparatus of claim 1, wherein said material inlet is arranged to allow gravity feed of wood chips though said material inlet.

8. The apparatus of claim 5, wherein said conveyor is located within an enclosure and said apparatus further comprises a water jet arrangement within said enclosure for spraying jets of water onto matter transported by said conveyor.

9. The apparatus of claim 1 further comprising:
    a hopper fixed to the material inlet;
    a position sensor for sensing a level of an upper surface of wood chip material; and
    an inlet conveyor mechanism for dropping wood chip material into said hopper in response to signals from the position sensor indicating that the level has dropped below a threshold level.

10. Apparatus for continuous manufacture of charcoal, comprising a unit having:
    chamber walls defining a chamber, an upper one of said walls defining a ceiling of a primary combustion space;
    a trough wall located within said chamber, said trough wall and a first one of said chamber walls defining a trough within said chamber such that said trough is defined to one side of said trough wall and said primary combustion space is defined to the other side of said trough wall;
    a material inlet located above said trough such that material passing through said material inlet is able to fall into the trough, said material inlet comprises a downwardly extending passageway defined by said first one of said chamber walls and a material inlet wall extending downwards from said ceiling, said material inlet wall having a lower edge positioned above said trough and said material inlet wall separating said passageway from said primary combustion space, such that heat generated within said primary combustion space passes through said material inlet wall into said passageway;
    a first air inlet located in said first one of said chamber walls such that, when material is located within the trough piled up into said material inlet, air passing from said first air inlet passes through said material and into the primary combustion space; and a second air inlet providing a flow of air downwards from said ceiling into said primary combustion space.

11. The apparatus of claim 10, wherein said trough extends along a vertical plane, said material inlet extends along said trough to one side of said vertical plane and said primary combustion space extends along said trough to the other side of said vertical plane, such that when particulate material is located within said trough piled up to said material inlet said particulate material defines a surface exposed to said primary combustion space.

12. The apparatus of claim 10, further comprising a fluid fuel burner located within said primary combustion space for increasing the temperature of gases within said primary combustion space.

13. The apparatus of claim 10, wherein said unit comprises a secondary combustion chamber having a gas outlet, said secondary combustion chamber being in communication with said primary combustion space such that gases are allowed to pass from said primary combustion space through said secondary combustion chamber to said outlet.

14. The apparatus of claim 10, further comprising a conveyor mechanism arranged to transport particulate matter from a bottom end of said trough.

15. The apparatus of claim 10, wherein:

said trough is defined by a pair of walls extending along said trough, said pair of walls comprising a rear wall and a front wall, said rear wall being positioned adjacent to said primary combustion space between said primary combustion space and said front wall; and said material inlet is located closer to said front wall than the rear wall.

16. The apparatus of claim 10, wherein said material inlet is arranged to allow gravity feed of wood chips though said material inlet.

17. The apparatus of claim 14, wherein said conveyor is located within an enclosure and said apparatus further comprises a water jet arrangement within said enclosure for spraying jets of water onto matter transported by said conveyor.

18. The apparatus of claim 10 further comprising:

a hopper fixed to the material inlet;

a position sensor for sensing a level of an upper surface of wood chip material; and an inlet conveyor mechanism for dropping wood chip material into said hopper in response to signals from the position sensor indicating that the level has dropped below a threshold level.

\* \* \* \* \*